US006907964B2

(12) United States Patent
Savard

(10) Patent No.: US 6,907,964 B2
(45) Date of Patent: Jun. 21, 2005

(54) RATCHET-LIKE ASSEMBLY FOR WINDING A COUNTERBALANCING MECHANISM OF A DOOR, DOOR ASSEMBLY INCLUDING THE SAME AND KIT FOR ASSEMBLING THE RATCHET-LIKE ASSEMBLY

(75) Inventor: Normand Savard, Drummondville (CA)

(73) Assignee: Canimex Inc., Quebec (CA)

( * ) Notice: Subject to any disclaimer, the term of this patent is extended or adjusted under 35 U.S.C. 154(b) by 2 days.

(21) Appl. No.: 10/622,810

(22) Filed: Jul. 17, 2003

(65) Prior Publication Data

US 2004/0089097 A1 May 13, 2004

(30) Foreign Application Priority Data

Jul. 17, 2002 (CA) ............................................. 2393866

(51) Int. Cl.[7] .............................................. F16D 63/00
(52) U.S. Cl. ....................... 188/82.84; 49/197; 160/191
(58) Field of Search ............................. 188/82.8–82.84; 49/197, 200, 445; 16/198, 199; 74/567; 192/44–45.1; 160/189–191

(56) References Cited

U.S. PATENT DOCUMENTS

| | | | | |
|---|---|---|---|---|
| 6,134,835 | A | * 10/2000 | Krupke et al. ................. | 49/200 |
| 6,198,242 | B1 | * 3/2001 | Yokomori et al. ........... | 318/445 |
| 6,229,233 | B1 | * 5/2001 | Torii et al. ................. | 310/75 R |
| 6,401,792 | B1 | * 6/2002 | Mullet et al. ................ | 160/188 |
| 6,408,925 | B1 | * 6/2002 | Dorma ........................ | 160/191 |
| 6,502,679 | B1 | * 1/2003 | Wang ........................... | 192/64 |
| 6,568,516 | B2 | * 5/2003 | Kemp, III ..................... | 192/45 |

* cited by examiner

Primary Examiner—Chris Schwartz
(74) Attorney, Agent, or Firm—Merchant & Gould P.C.

(57) ABSTRACT

A ratchet-like assembly for winding a counterbalancing mechanism of a door. The ratchet-like assembly includes at least one plate, at least one ridge, an actuator, and at least one pawling element. Each plate is operatively mounted onto a fixed structure and includes an orifice through which extends a shaft of the counterbalancing mechanism and about which the shaft is rotatable along opposite first and second directions of rotation. Each ridge is provided about an outer edge of the corresponding orifice. The actuator is operatively connected to each plate and is operable between a locked configuration and an unlocked configuration. Each pawling element is mounted onto the actuator and is positioned within a corresponding ridge, adjacent to the shaft. Each ridge and each corresponding pawling element are shaped and sized so that when the actuator is operated in the locked configuration, each pawling element is operatively pressed against the shaft and its corresponding ridge for preventing the shaft from rotating along the first direction of rotation, and when the actuator is operated in the unlocked configuration, each pawling element is operatively urged away from the shaft and its corresponding ridge for allowing the shaft to rotate along both the first and second directions of rotation. The present ratchet-like assembly enables to easily install and calibrate counterbalancing mechanisms of various types of door assemblies where a torque must be applied and maintained onto a given shaft of the door assembly.

20 Claims, 3 Drawing Sheets

LOCKED

UNLOCKED

RATCHET-LIKE ASSEMBLY FOR WINDING A COUNTERBALANCING MECHANISM OF A DOOR, DOOR ASSEMBLY INCLUDING THE SAME AND KIT FOR ASSEMBLING THE RATCHET-LIKE ASSEMBLY

FIELD OF THE INVENTION

The present invention relates to a ratchet-like assembly, also referred to as an integrated bracket ratchet system, for winding a counterbalancing mechanism of a door, to a door assembly including such a ratchet-like assembly, as well as to a kit for assembling the ratchet-like assembly. The present invention enables to ease the installation and calibration of counterbalancing mechanisms of various types of garage doors and the like, such as mini-warehouse doors and commercial rolling steel doors for example, but may also be used also with any other type of counterbalancing installation where a torque must be applied and maintained onto a given shaft.

BACKGROUND OF THE INVENTION

It is known in the art that most garage doors and the like currently used are counterbalanced by different suitable means. Some doors are counterbalanced by means of a counterweight and other doors are counterbalanced by means of an energy-storing device, such as a spring under traction or torsion for example. These counterbalancing systems are typically used to ease the force required by a user or a motorized door system to raise and lower the door. In order to put a spring under tension, an installer typically must wind the spring, generally a torsional spring, and maintain a given torque or tension in the spring by different methods and apparatuses. Actually, some systems employ a U-bolt or a special bracket which are tightened and maintained in place when the spring is under tension.

It is also known in the art that the shaft around which the door is wrapped usually rests on a bearing, generally seated in a plug (or "anchor") which maintains and holds the spring. Usually, this bearing must be installed on site and this is often a problem for the installer because the spring is under tension. To ease installation, the spring may be installed at manufacture but in such cases, the plug (or anchor) must be installed under tension and kept as such during transportation.

It is also known in the art that very often, the counterbalancing mechanisms of the aforementioned type of installations will often use unidirectional or "one-way" bearings. Similarly to regular bearings, unidirectional bearings comprise an inner ring which is slidably rotatable within an outer ring, the outer ring being concentrically mounted about the inner ring, the inner and outer rings being slidably movable with respect to another by means of bearings positioned between both rings. Unidirectional bearings are generally designed so as to have an inner portion of the outer ring provided with appropriately shaped grooves so that when the inner ring is rotated along one direction, there is a relative movement between the inner and outer rings, whereas when the inner ring is rotated along the opposite direction, then the bearings of the bearing are blocked by the corresponding grooves of the outer ring, thereby blocking relative movement between the inner ring and the outer ring. It is also known in the art that these unidirectional bearings are quite elaborate and costly to manufacture, and also are fairly difficult to install, replace, maintain, adjust and/or repair on counterbalancing mechanisms which are under tension. Indeed, this results in additional assembling steps and components required, which is disadvantageous, namely in terms of time and costs.

Hence, in light of the aforementioned, there is a need for an improved device or assembly which, by virtue of its design and components, would be able to overcome some of the aforementioned prior art problems.

SUMMARY OF THE INVENTION

The object of the present invention is to provide a ratchet-like assembly, also known as a "winding system", which satisfies some of the above-mentioned needs and which is thus an improvement over the devices, systems and/or devices known in the prior art.

In accordance with the present invention, the above object is achieved with a ratchet-like assembly for winding a counterbalancing mechanism of a door, the ratchet-like assembly comprising:

at least one plate operatively mounted onto a fixed structure, the at least one plate including an orifice through which extends a shaft of the counterbalancing mechanism of the door and about which said shaft is rotatable along opposite first and second directions of rotation;

blocking means mounted onto the at least one plate and being operatively cooperable with the shaft for blocking the same from rotating along the first direction of rotation; and an actuator operatively connected to the blocking means for selectively operating the blocking means, the actuator being operable between a locked configuration where the blocking means cooperate with the shaft so as to allow it to rotate along the second direction only, and an unlocked configuration where the blocking means are removed from the shaft so as to allow it to rotate freely along both the first and second directions of rotation.

According to another aspect of the invention, there is also provided a ratchet-like assembly for winding a counterbalancing mechanism of a door, the ratchet-like assembly comprising:

at least one plate operatively mounted onto a fixed structure, the at least one plate including an orifice through which extends a shaft of the counterbalancing mechanism of the door and about which said shaft is rotatable along opposite first and second directions of rotation;

at least one ridge provided about a peripheral edge of the orifice;

an actuator operatively connected to the at least one plate, the actuator being operable between a locked configuration and an unlocked configuration; and at least one pawling element mounted onto the actuator, and being positioned within the at least one ridge, adjacent to the shaft;

wherein the at least one ridge and the at least one pawling element are shaped and sized so that when the actuator is operated in the locked configuration, the at least one pawling element is operatively pressed against the shaft and the at least one ridge for preventing the shaft from rotating along the first direction of rotation, and when the actuator is operated in the unlocked configuration, the at least one pawling element is operatively urged away from the shaft and the at least one ridge for allowing said shaft to rotate along both the first and second directions of rotation.

According to another aspect of the invention, there is also provided a ratchet-like assembly for winding a counterbalancing mechanism of a door, the ratchet-like assembly comprising:

first and second plates operatively mounted onto a fixed structure, said first and second plates extending substantially parallel to one another and made integral to one another, each plate including an orifice through which extends a shaft of the counterbalancing mechanism of a door and about which said shaft is rotatable along opposite first and second directions of rotation;

four ridges provided about a peripheral edge of each orifice;

an actuating ring mounted about the shaft and positioned between the first and second plates, said actuating ring comprising projections for abutting against the plates for positioning the actuating ring at a given distance from each of said plates; and four rollers pivotally mounted about opposite first and second sides of the actuating ring, each side facing the first and second plates respectively, each of said rollers being positioned within a corresponding ridge, adjacent to the shaft;

wherein each roller and each corresponding ridge are shaped and sized so that when the actuator is operated in the locked configuration, each roller is operatively pressed against the shaft and its corresponding ridge for preventing the shaft from rotating along the first direction of rotation, and when the actuator is operated in the unlocked configuration, each roller is operatively urged away from the shaft and its corresponding ridge for allowing said shaft to rotate along both the first and second directions of rotation.

According to yet another aspect of the invention, there is also provided a counterbalancing mechanism provided with a ratchet-like assembly, the ratchet-like assembly comprising:

at least one plate operatively mounted onto a fixed structure, the at least one plate including an orifice through which extends a shaft and about which said shaft is rotatable along opposite first and second directions of rotation;

at least one ridge provided about a peripheral edge of the orifice;

an actuator operatively connected to the at least one plate, the actuator being operable between a locked configuration and an unlocked configuration; and at least one pawling element mounted onto the actuator, and being positioned within the at least one ridge, adjacent to the shaft;

wherein the at least one ridge and the at least one pawling element are shaped and sized so that when the actuator is operated in the locked configuration, the at least one pawling element is operatively pressed against the shaft and the at least one ridge for preventing the shaft from rotating along the first direction of rotation, and when the actuator is operated in the unlocked configuration, the at least one pawling element is operatively urged away from the shaft and the at least one ridge for allowing said shaft to rotate along both the first and second directions of rotation.

According to yet another aspect of the invention, there is also provided a door assembly having a counterbalancing mechanism provided with a ratchet-like assembly, the ratchet-like assembly comprising:

at least one plate operatively mounted onto a fixed structure, the at least one plate including an orifice through which extends a shaft of the counterbalancing mechanism of the door assembly and about which said shaft is rotatable along opposite first and second directions of rotation;

at least one ridge provided about a peripheral edge of the orifice;

an actuator operatively connected to the at least one plate, the actuator being operable between a locked configuration and an unlocked configuration; and at least one pawling element mounted onto the actuator, and being positioned within the at least one ridge, adjacent to the shaft;

wherein the at least one ridge and the at least one pawling element are shaped and sized so that when the actuator is operated in the locked configuration, the at least one pawling element is operatively pressed against the shaft and the at least one ridge for preventing the shaft from rotating along the first direction of rotation, and when the actuator is operated in the unlocked configuration, the at least one pawling element is operatively urged away from the shaft and the at least one ridge for allowing said shaft to rotate along both the first and second directions of rotation.

According to yet another aspect of the invention, there is also provided a kit for assembling a ratchet-like assembly for winding a counterbalancing mechanism of a door, the kit comprising:

at least one plate operatively mountable onto a fixed structure, the at least one plate including an orifice for receiving a shaft of the counterbalancing mechanism of the door and about which said shaft is rotatable along opposite first and second directions of rotation;

at least one ridge provided about a peripheral edge of the orifice;

an actuator operatively connectable to the at least one plate, the actuator being operable between a locked configuration and an unlocked configuration; and at least one pawling element mountable onto the actuator, and being positionable within the at least one ridge, adjacent to the shaft;

wherein the at least one ridge and the at least one pawling element are shaped and sized so that, once the ratchet-like assembly is assembled, when the actuator is operated in the locked configuration, the at least one pawling element is operatively pressed against the shaft and the at least one ridge for preventing the shaft from rotating along the first direction of rotation, and when the actuator is operated in the unlocked configuration, the at least one pawling element is operatively urged away from the shaft and the at least one ridge for allowing said shaft to rotate along both the first and second directions of rotation.

The objects, advantages and other features of the present invention will become more apparent upon reading of the following non-restrictive description of a preferred embodiment thereof, given for the purpose of exemplification only with reference to the accompanying drawings.

DETAILED DESCRIPTION OF A PREFERRED EMBODIMENT OF THE INVENTION

Figure 1:
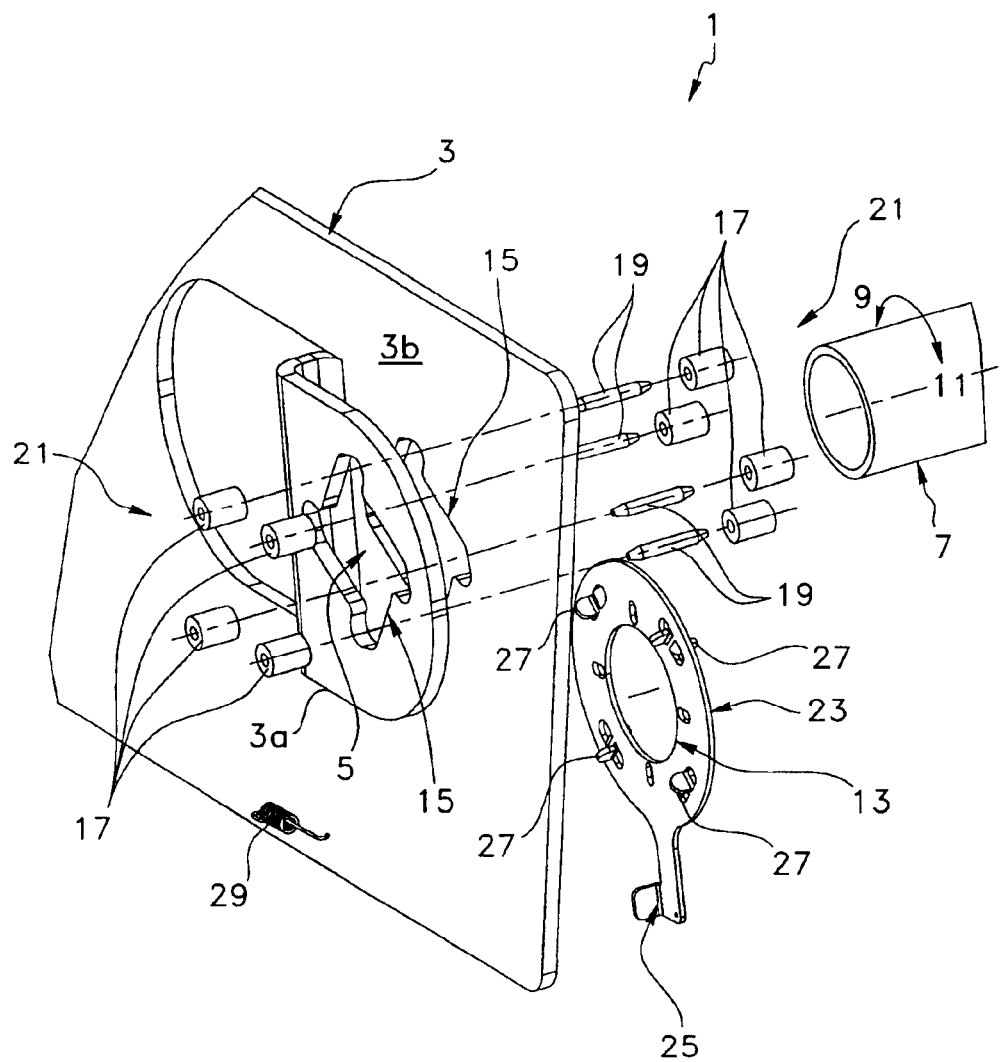
FIG. 1 is an fragmentary exploded view of some of the components of the ratchet-like assembly according to a preferred embodiment of the invention, the ratchet-like assembly being shown with a shaft of a counterbalancing mechanism.

In the following description, the same numerical references refer to similar elements. The embodiment shown in the figures is only a preferred embodiment.

Moreover, although the present invention was primarily designed for use with winding systems of mini-warehouse doors and commercial rolling steel doors, it may be used with other types of doors and objects and in other fields, as apparent to a person skilled in the art. For this reason, expressions such as "mini", "warehouse", "rolling", "steel", etc. used herein should not be taken as to limit the scope of the present invention and includes all other kinds of doors or items with which the present invention could be used and may be useful.

Moreover, in the context of the present invention, the expressions "winding system", "ratchet-like assembly", as well as any other equivalent expressions and/or compound words thereof, may be used interchangeably, as apparent to a person skilled in the art. Furthermore, the same applies for any other mutually equivalent expressions, such as "door" and "door assembly", as well as "support", "bracket" and "plate" for example, as also apparent to a person skilled in the art.

In addition, although the preferred embodiment of the present invention as illustrated in the accompanying drawings comprises various components, such as rollers, pins, a ring, etc., and although the preferred embodiment of the ratchet-like assembly 1 as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations therebetween, as well as other suitable geometrical configurations may be used for the ratchet-like assembly 1 and corresponding parts according to the present invention, as briefly explained herein and as inferred herefrom, without departing from the scope of the invention.

Broadly described, the present invention relates to a ratchet-like assembly 1, also known as a "winding system" or an "integrated bracket ratchet system", for use with a counterbalancing mechanism of a garage door and/or the like, such as a mini-warehouse door and a rolling door assembly for example, as is known in the art, but may also be used also with any other type of counterbalancing installation where a torque must be applied and maintained onto a given shaft of the installation.

The ratchet-like assembly 1 comprises at least one plate 3 operatively mounted onto a fixed structure, each plate 3 including an orifice 5 through which extends a shaft 7 of the counterbalancing mechanism of the door and about which said shaft 7 is rotatable along opposite first and second directions 9,11 of rotation. The ratchet-like assembly 1 also comprises blocking means mounted onto the at least one plate 3 and being operatively cooperable with the shaft 7 for blocking the same from rotating along the first direction 9 of rotation. The ratchet-like assembly 1 also comprises an actuator 13 operatively connected to the blocking means for selectively operating the blocking means, the actuator 13 being operable between a locked configuration, as better shown in FIGS. 2 and 3, where the blocking means cooperate with the shaft 7 so as to allow it to rotate along the second direction 11 only, similar to a ratchet system, and an unlocked configuration where the blocking means are removed from the shaft 7 so as to allow it to rotate freely along both the first and second directions 9,11 of rotation, as better shown in FIGS. 4 and 5.

In doing so, the present ratchet-like assembly 1 enables an installer to turn the shaft 7 of the counterbalancing mechanism with an appropriate tool and should the installer stop turning the shaft 7, the shaft 7 which is now under tension due to the torque created by a loaded torsional spring (not shown), for example, of the counterbalancing mechanism, may then be blocked in position by the blocking means which impede the shaft 7 from rotating along the first direction 9 corresponding to a decrease in torque.

Figure 2:
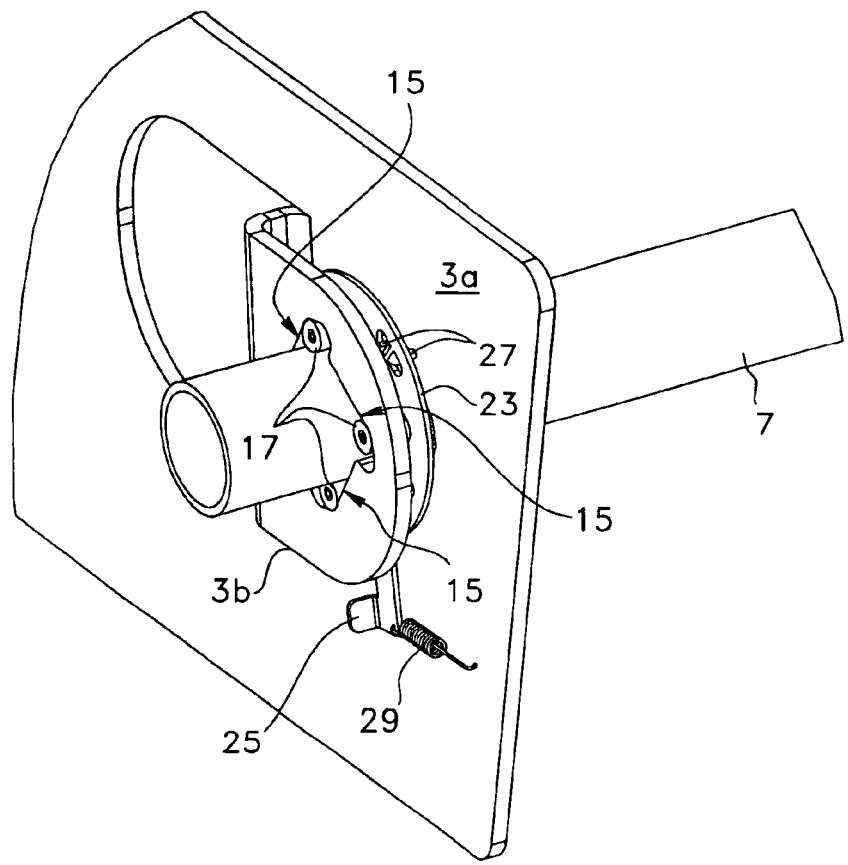
FIG. 2 is a perspective view of the ratchet-like assembly shown in FIG. 1, the ratchet-like assembly being shown now in an assembled configuration and cooperating with a shaft of a counterbalancing mechanism in a locked configuration.
Figure 4:
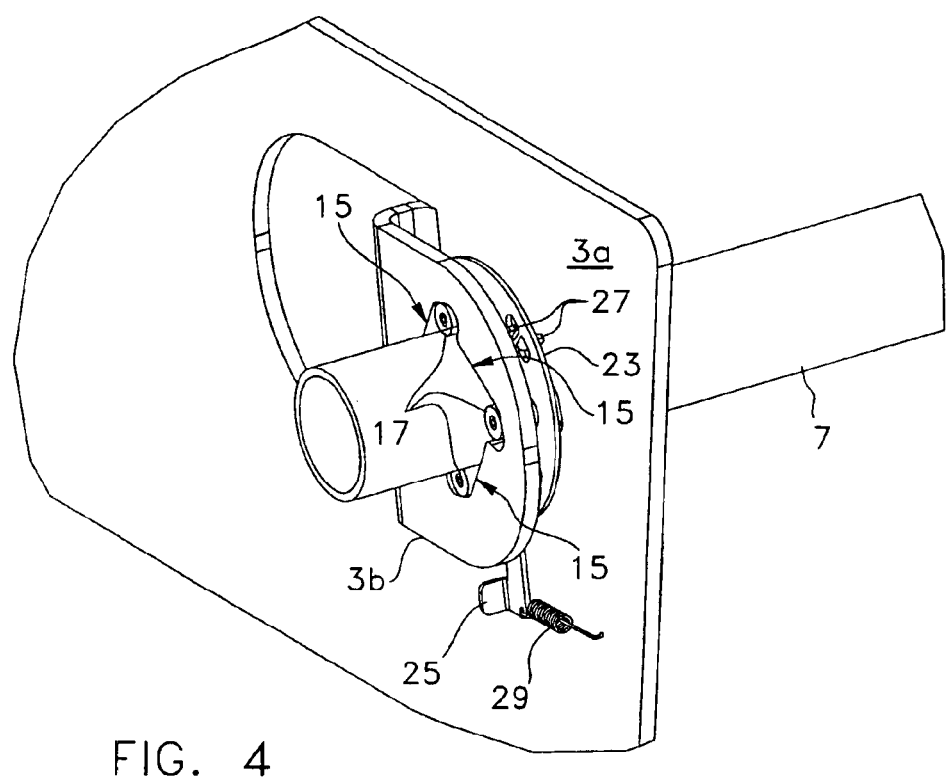
FIG. 4 is a perspective view of the ratchet-like assembly shown in FIG. 1, the ratchet-like assembly being shown now in an assembled configuration and cooperating with a shaft of a counterbalancing mechanism in an unlocked configuration.

According to the preferred embodiment of the invention, as better shown in FIGS. 2 and 4, the present ratchet-like assembly 1 comprises biasing means cooperating with the actuator 13 for urging the same into the locked configuration. The biasing means may comprise a loaded spring 29 operatively connected between the actuator 13 and the at least one support. Alternatively, the biasing means may consist of the effect of gravity acting on the actuator 13 and corresponding components operatively connected thereto so as to remove the need of a "spring" 29 per se. It is worth mentioning also that other suitable biasing means for carrying out the above-mentioned function may be used according to the present invention, as apparent to a person skilled in the art.

As can be easily understood when referring to the accompanying drawings, the blocking means of the ratchet-like assembly 1 preferably comprise at least one ridge 15 provided along a peripheral edge of the orifice 5 of the at least one plate 3, and at least one roller 17 pivotally mounted about a corresponding pin 19 connected to the actuator 13, and being positioned within the at least one ridge 15 and adjacent to the shaft 7. The at least one ridge 15 and the at least one roller 17 are shaped and sized so that when the actuator 13 is operated in the locked configuration, the at least one roller 17 is operatively pressed against the shaft 7 and the at least one ridge 15 for preventing the shaft 7 from rotating in the first direction 9 of rotation, as better shown in FIGS. 2 and 3, and when the actuator 13 is operated in the unlocked configuration, the at least one roller 17 is operatively urged away from the shaft 7 and the at least one ridge 15 for allowing the shaft 7 to rotate along both the first and second directions 9, 11 of rotation, as better shown in FIGS. 4 and 5.

Indeed, according to the present invention, the ratchet-like assembly 1 for winding a counterbalancing mechanism of a door preferably comprises at least one plate 3, at least one ridge 15, an actuator 13, and at least one pawling element 21 which serves as blocking means. Preferably, each plate 3 is operatively mounted onto a fixed structure and includes an orifice 5 through which extends the shaft 7 of the counterbalancing mechanism and about which said shaft 7 is rotatable along opposite first and second directions 9, 11 of rotation, as can be easily understood from FIG. 1. As also better shown in this figure, each ridge 15 of the assembly 1 is preferably provided along a peripheral edge of the orifice 5 of a corresponding plate 3.

The actuator 13 is operatively connected to each plate 3, and is operable between a locked configuration and unlocked configuration, as better shown in FIGS. 2–3 and 4–5 respectively. Each pawling element 21 is mounted onto the actuator 13 and is positioned within a corresponding ridge 15, adjacent to the shaft 7.

The ratchet-like assembly 1 is devised, and each corresponding pairs of ridge-pawling element is shaped and sized so that when the actuator 13 is operated in the locked configuration, each pawling element 21 is operatively pressed against the shaft 7 and its corresponding ridge 15 for preventing the shaft 7 from rotating along the first direction 9 of rotation, and thereby preventing the shaft 7 from loosing a torque which would be generated by an installer by turning the shaft 7 along the second direction 11. When the actuator 13 is operated in the unlocked configuration, as better shown in FIGS. 4 and 5, each pawling element 21 is operatively urged away from the shaft 7 and its corresponding ridge 15 for allowing the shaft 7 to rotate along both the first and second directions of rotation. Thus, if an excessive torque has been generated onto the counterbalancing mechanism, and as can be easily understood when referring to the accompanying drawings, an installer may simply bias the actuator 13 in the unlocked configuration so as to adjustably and controllably allow the shaft 7 to rotate along the first direction 9 so as to enable to decrease the torque to a desired level.

Figure 3:
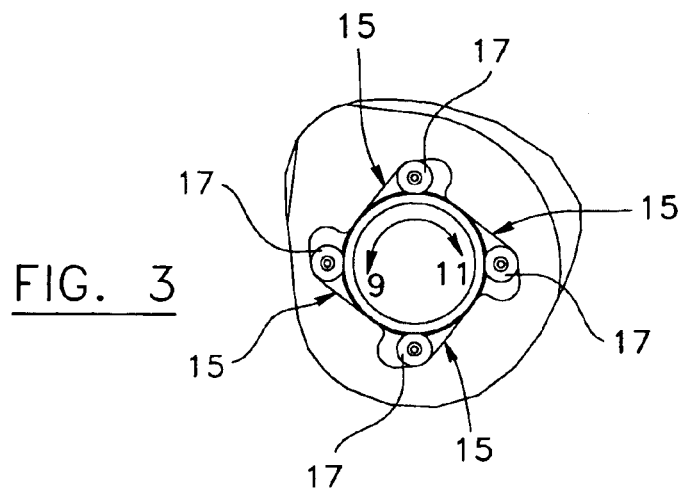
FIG. 3 is a partial front plan view of what is shown in FIG. 2.
Figure 5:
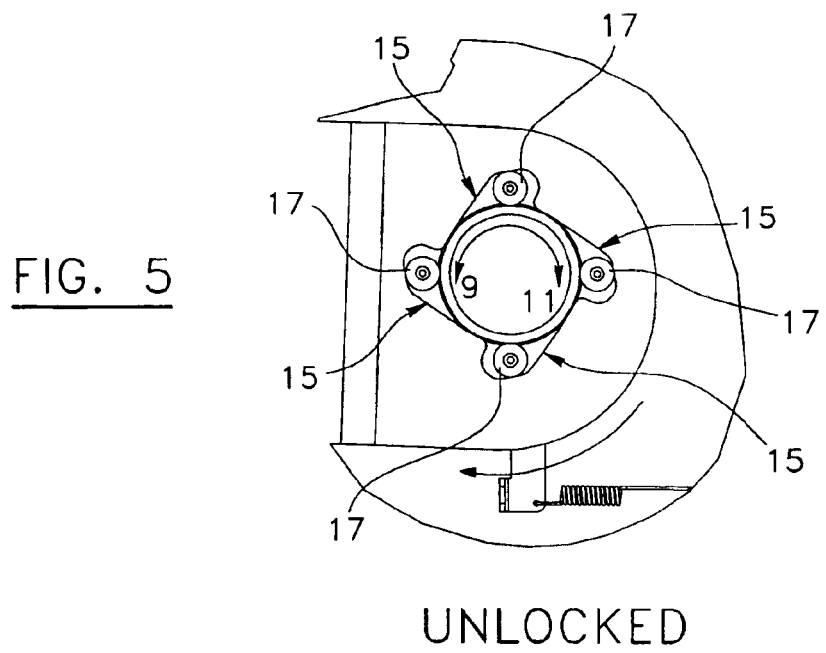
FIG. 5 is a partial front plan view of what is shown in FIG. 4.

As better shown in FIG. 1, the actuator 13 of the present ratchet-like assembly 1 preferably comprises a ring 23 mounted about the shaft 7, and positioned adjacent to each plate 3, said ring 23 being provided preferably with a handle 25 for enabling a user to selectively urge the actuator 13 in the unlocked configuration, as can be easily understood when contrasting FIGS. 2–3 with FIGS. 4–5.

Preferably also, each pawling element 21 comprises a roller 17 pivotally mounted about a corresponding pin 19 connected to the actuating ring 23, and preferably also, each pin 19 projects perpendicularly through the ring 23. The ring 23 may also comprise projections 27, as also better shown in FIG. 1, for abutting against each corresponding plate 3 so as to properly position the ring 23 at a given distance from each of said plates 3a, 3b.

Although according to the present invention, the ratchet-like assembly 1 may only comprise one single plate 3 with one single corresponding orifice 5, preferably first and second plates 3a, 3b are provided and are disposed substantially parallel to one another, as better shown in FIG. 1. Indeed, a single bracket may be used to provide both the first and the second plates 3a, 3b which are preferably made of a single piece and of a single material, thus made integral to one another, as can be easily understood when referring to FIG. 1, and as apparent to a person skilled in the art.

The preferred embodiment illustrated in the accompanying drawings is preferably intended for minimizing components and assembling steps, while providing a suitable winding and ratchet system for properly adjusting and calibrating the counterbalancing mechanism of a given door assembly.

As aforementioned, the biasing means preferably comprise a loaded spring 29 operatively connected between the ring 23 and a first plate 3, but more specifically also, the loaded spring 29 is preferably operatively connected between the handle 25 of the ring 23 and the first plate 3. As aforementioned, several other suitable biasing means may be used according to the present invention, of which an example is the gravitational force that could act onto the actuator 13 and corresponding components operatively connected thereto which would then in turn be devised so that the gravitational pull would urge the actuator 13 into the locked configuration, as is preferably intended.

Moreover, each roller 17 is preferably provided with a knurled surface, or provided with any other suitable covering, such as an elastomer covering, for example, for increasing gripping and pressing of the rollers 17 onto the shaft 7 and corresponding ridges 15 when the actuator 13 is in the locked configuration, while allowing the shaft 7 to rotate substantially freely along both the first and second directions 9, 11 of rotation when the actuator 13 is in the unlocked configuration.

It is worth mentioning that according to another aspect of the present invention, there is also provided a counterbalancing mechanism provided with a ratchet-like assembly 1 according to the one described herein. Moreover, according to yet another aspect of the present invention, there is also provided a door assembly having a counterbalancing mechanism provided with a ratchet-like assembly 1 such as the one described herein. Finally, according to yet another aspect of the present invention, there is also preferably provided a kit for assembling a ratchet-like assembly 1 such as the one described and illustrated herein, such as in FIG. 1 for example.

As aforementioned, the ratchet-like assembly 1 preferably comprises support means for supporting a shaft 7 of the counterbalancing mechanism of the garage door, the shaft 7 being rotatable about the support means. The ratchet-like assembly 1 preferably also comprises blocking means operable between locked and unlocked positions. In the locked position, the blocking means are operatively connected to the shaft 7 and allow it to rotate along one direction 11, while blocking its rotation along the opposite direction 9. In the unlocked position, the blocking means are operatively disconnected from the shaft 7 and allow it to rotate freely in both directions 9, 11. Preferably also, the ratchet-like assembly 1 comprises actuating means for selectively operating the blocking means between the locked and unlocked positions.

Preferably, the support means comprise a bracket mounted onto a fixed structure, such as a wall for example, by means of suitable fasteners, as apparent to a person skilled in the art. According to the present invention, the bracket is devised, as better illustrated in FIG. 1, to provide the above-described first and second plates 3a, 3b, having each a corresponding orifice 5 and being positioned preferably opposite to one another, as shown.

According to the particular embodiment of the invention shown in the accompanying drawings, the ratchet-like assembly 1 preferably comprises a single actuator 13 and four pairs of rollers 17, each pair of rollers 17 preferably consisting of two rollers 17 connected to one another by means of a pin 19. Each roller 17 is preferably devised to cooperate with a corresponding ridge 15 of either the first or the second orifice 5, as better shown in FIG. 1. The rollers 17 are preferably maintained in place by the actuating ring 23 by introducing the pins 19 of the pairs of rollers 17 into corresponding holes provided on the ring 23. Preferably also, the shaft 7 of the counterbalancing mechanism which is connected to the door by means of a drum is introduced into the corresponding orifices 5, of the plates 3, and into the corresponding orifice 5 of the ring 23. Preferably, the ring 23 comprises projections 27 for maintaining the ring 23 in place (i.e. aligned) between the plates 3, as can be easily understood by a apparent to a person skilled in the art.

Preferably also, the actuating means comprise a handle 25 provided on the ring 23 for actuating the ring 23 and corresponding rollers 17 between the locked and unlocked positions, as better shown in FIGS. 2–3 and 4–5 respectively. Preferably also, a spring 29 having opposite ends connected to the ring handle 25 and to a point on the bracket respectively is used for biasing the ring 23 into the locked position.

In its normal use, as better shown in FIG. 2, the shaft 7 which is attached to the door by means of a drum, on which a rolling steel door is pre-installed for example, is placed into the orifices 5, of the plates 3 of the bracket. The bracket is then bolted to the wall. The ratchet-like assembly 1 can then be operational. The garage door installer will then turn the shaft 7 with a pipe wrench or an appropriate tool and the small rollers 17 will then turn on themselves freely in their corresponding ridges 15. When the installer stops turning the shaft 7, this shaft 7 is now under tension due to the torque created by the torsional spring (or any other suitable counterbalancing device) of the counterbalancing mechanism of the door. As can be easily understood, under this torque, the shaft 7 wants to turn back to its original position but is then blocked in position by the combined effect produced by the rollers 17 and the particular shape of the orifices 5 and corresponding ridges 15, i.e. by the friction between the shaft 7 and rollers 17 and by the friction between the rollers 17 and the bracket ridges 15, in every shaft position under tension along this direction. Indeed, the ratchet-like assembly 1 according to the present invention, when in the locked position, allows the shaft 7 to turn in one direction 11 but blocks it in the other direction 9, as can be easily understood when referring to the accompanying drawings.

The tension thus created by the torsional spring will be maintained with the ratchet-like assembly 1. Furthermore, as also apparent to a person skilled in the art, a user of the ratchet-like assembly 1 or a garage door installer may also further turn the shaft 7 along the second direction 11 to further increase the torque. This additional torque created will also be maintained with the ratchet-like assembly 1 in the manner explained hereinabove. In contrast, the ring 23 and corresponding handle 25 is designed to allow to disengage the rollers 17, as shown in FIGS. 4 and 5, and thus reduce the torque on the shaft 7 accordingly. In its normal use, the ring 23 is preferably maintained in place (i.e. preferably, the locked position) by the spring 29. Under this position, the actuating ring 23 forces rollers 17 in one direction. As long as the shaft 7 turns in the allowable direction 11, the rollers 17 will turn on themselves, whereas as soon as the shaft 7 is released, the tension on the spring forces the rollers 17 against the ridges 15 of the orifices 5, which in turn blocks the shaft's rotation. To decrease the torque on the shaft 7, installer simply has to pull the handle 25 of the ring 23 and disengage the rollers 17, the shaft 7 is then free to be unwind with a special tool such a pipe wrench for example. FIGS. 4 and 5 show this movement, in which handle 25 is pulled and rollers 17 are forced against bigger cavity section of the ridges 15 where their special shape move rollers 17 away from the shaft 7. This movement of the guide plate lets the shaft 7 free to turn in both directions 9, 11.

Several modifications can be made to the above-mentioned ratchet-like assembly 1, without departing from the scope of the present invention. Indeed, the actuating ring 23 and the handle 25 thereof may be placed and designed in a way that gravity will act to replace the effect of the spring 29. The orifice(s) 5, may be integrated in another plate or a single bracket and their shapes may be devised to selectively block the shaft 7 in both the first and second directions 9, 11 of rotation. Furthermore, the ratchet-like assembly 1 may be connected or joined with ordinary bearings, thus eliminating the need for two guide plates.

As may now be appreciated, the present invention is a substantial improvement over the prior art in that by virtue of its design and components, the ratchet-like assembly 1 according to the present invention acts as a unidirectional bearing, without the use of an inner ring. Indeed, as may now be appreciated, the ratchet-like assembly 1 according to the present invention uses the shaft of the counterbalancing mechanism as the inner ring. Furthermore, the present invention is also advantageous in that, by virtue of its design and components, fewer components are required for achieving the same result as with a unidirectional bearing and thus less material is used, thus resulting in substantial savings. Moreover, the present invention is also advantageous in that the ratchet-like assembly 1 may be activated or disactivated by simply operating its handle 25. In addition, the present invention is also a substantial improvement over the prior art in that, by virtue of its design and components, it may act as an adjustment device in order to trigger or untrigger the rotation of the shaft 7 with respect to the bracket so as to be able to adjust the tension which is loaded onto the torsional spring or any other counterbalancing component of a door assembly, as apparent to a person skilled in the art. Hence, in view of the above, it may now be appreciated that the present invention represents an important advantage over previous devices known in the prior art, in terms of performance and in terms of costs.

Of course, numerous modifications could be made to the above-described embodiments without departing from the scope of the invention as defined in the appended claims.

What is claimed is:

1. A ratchet assembly for winding a counterbalancing mechanism of a door, the ratchet assembly comprising:
   at least one plate operatively mounted onto a fixed structure, the at least one plate including an orifice through which extends a shaft of the counterbalancing mechanism of the door and about which said shaft is rotatable along opposite first and second directions of rotation;
   at least one ridge provided about a peripheral edge of the orifice;
   an actuator operatively connected to the at least one plate, the actuator being operable between a locked configuration and an unlocked configuration; and
   at least one pawling element mounted onto the actuator, and being positioned within the at least one ridge, adjacent to the shaft;
   wherein the at least one ridge and the at least one pawling element are shaped and sized so that when the actuator is operated in the locked configuration, the at least one pawling element is operatively pressed against the shaft and the at least one ridge for preventing the shaft from rotating along the first direction of rotation, and when the actuator is operated in the unlocked configuration, the at least one pawling element is operatively urged away from the shaft and the at least one ridge for allowing said shaft to rotate along both the first and second directions of rotation.

2. A ratchet assembly according to claim 1, wherein the ratchet assembly comprises biasing means for biasing the actuator into the locked configuration.

3. A ratchet assembly according to claim 2, wherein the actuator comprises a ring mounted about the shaft, positioned adjacent to the at least one plate, the ring being provided with a handle for enabling a user to selectively urge the actuator into the unlocked configuration.

4. A ratchet assembly according to claim 3, wherein each pawling element comprises a roller pivotally mounted about a corresponding pin connected to the ring.

5. A ratchet assembly according to claim 4, wherein the ring comprises projections for abutting against the at least one plate for positioning the ring at a given distance from the at least one plate.

6. A ratchet assembly according to claim 5, wherein the ratchet assembly comprises first and second plates extending substantially parallel to one another, and wherein the ring is positioned between said plates and comprises projections for abutting against the plates for positioning the ring at a given distance from each of said plates.

7. A ratchet assembly according to claim 6, wherein the plates are made integral to one another.

8. A ratchet assembly according to claim 7, wherein the biasing means comprises a loaded spring operatively connected between the handle of the ring and the first plate.

9. A ratchet assembly according to claim 7, wherein the biasing means comprise gravitational effect acting onto the actuator and components operatively connected thereto.

10. A door assembly having a counterbalancing mechanism provided with a ratchet assembly according to claim 6.

11. A door assembly having a counterbalancing mechanism provided with a ratchet assembly according to claim 5.

12. A ratchet assembly according to claim 5, wherein the biasing means comprises a loaded spring operatively connected between the ring and the at least one support plate.

13. A ratchet assembly according to claim 12, wherein each roller is provided with a knurled surface.

14. A door assembly having a counterbalancing mechanism provided with a ratchet assembly according to claim 1.

15. A ratchet assembly for winding a counterbalancing mechanism of a door, the ratchet assembly comprising:
  at least one plate operatively mounted onto a fixed structure, the at least one plate including an orifice through which extends a shaft of the counterbalancing mechanism of the door and about which said shaft is rotatable along opposite first and second directions of rotation;
  blocking means mounted onto the at least one plate and being operatively cooperable with the shaft for blocking the same from rotating along the first direction of rotation; and
  an actuator operatively connected to the blocking means for selectively operating the blocking means, the actuator being operable between a locked configuration where the blocking means cooperate with the shaft so as to allow it to rotate along the second direction only, and an unlocked configuration where the blocking means are removed from the shaft so as to allow it to rotate freely along both the first and second directions of rotation.

16. A ratchet assembly according to claim 15, wherein the ratchet assembly comprises biasing means cooperating with the actuator for urging the same into the locked configuration.

17. A ratchet assembly according to claim 16, wherein the blocking means comprises:
  at least one ridge provided along a peripheral edge of the orifice of the at least one plate; and
  at least one roller pivotally mounted about a corresponding pin connected to the actuator, and being positioned within the at least one ridge and adjacent to the shaft, the at least one ridge and the at least one roller being shaped and sized so that when the actuator is operated in the locked configuration, the at least one roller is operatively pressed against the shaft and the at least one ridge for preventing the shaft from rotating in the first direction, and when the actuator is operated in the unlocked configuration, the at least one roller is operatively urged away from the shaft and the at least one ridge for allowing the shaft to rotate along both the first and second directions of rotation.

18. A door assembly having a counterbalancing mechanism provided with a ratchet assembly according to claim 17.

19. A door assembly having a counterbalancing mechanism provided with a ratchet assembly according to claim 15.

20. A kit for assembling a ratchet assembly for winding a counterbalancing mechanism of a door, the kit comprising:
  at least one plate operatively mountable onto a fixed structure, the at least one plate including an orifice for receiving a shaft of the counterbalancing mechanism of the door and about which said shaft is rotatable along opposite first and second directions of rotation;
  at least one ridge provided about a peripheral edge of the orifice;
  an actuator operatively connectable to the at least one plate, the actuator being operable between a locked configuration and an unlocked configuration; and
  at least one pawling element mountable onto the actuator, and being positionable within the at least one ridge, adjacent to the shaft;
  wherein the at least one ridge and the at least one pawling element are shaped and sized so that, once the ratchet assembly is assembled, when the actuator is operated in the locked configuration, the at least one pawling element is operatively pressed against the shaft and the at least one ridge for preventing the shaft from rotating along the first direction of rotation, and when the actuator is operated in the unlocked configuration, the at least one pawling element is operatively urged away from the shaft and the at least one ridge for allowing said shaft to rotate along both the first and second directions of rotation.

* * * * *